April 14, 1953     R. F. HEINJE     2,634,675
TRAILER HITCH FOR HAY BALERS
Filed Jan. 4, 1951     2 SHEETS—SHEET 1
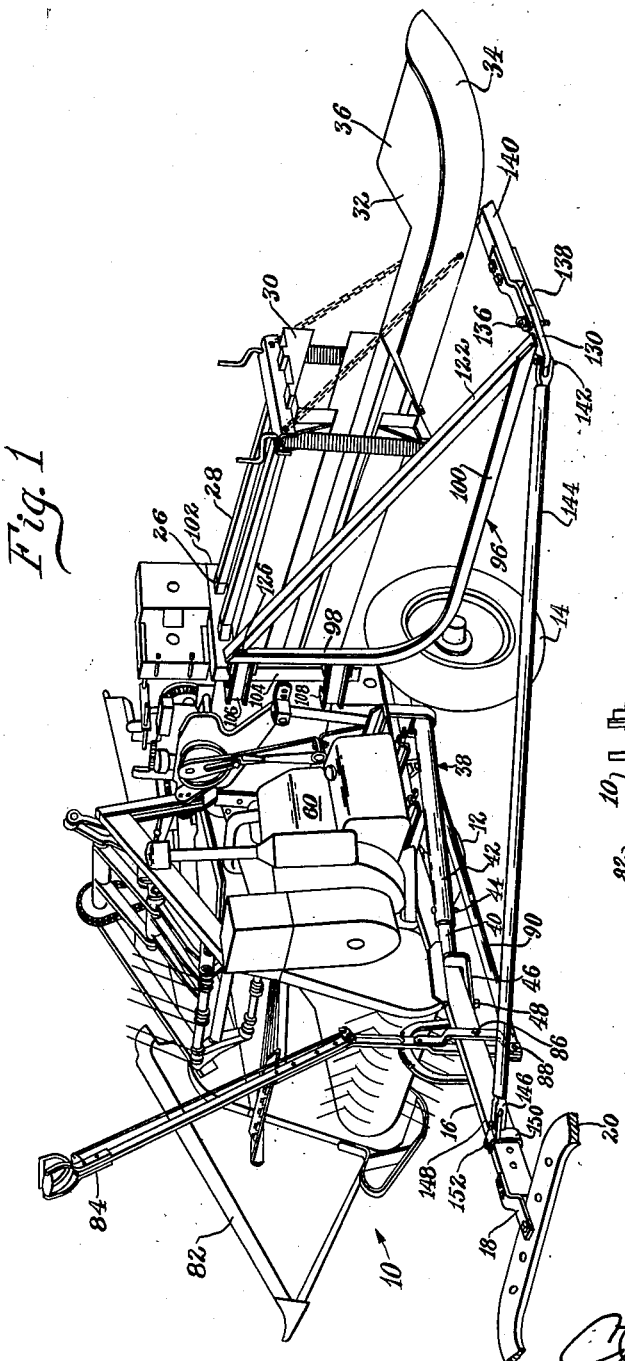
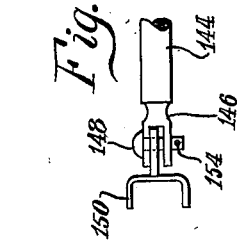
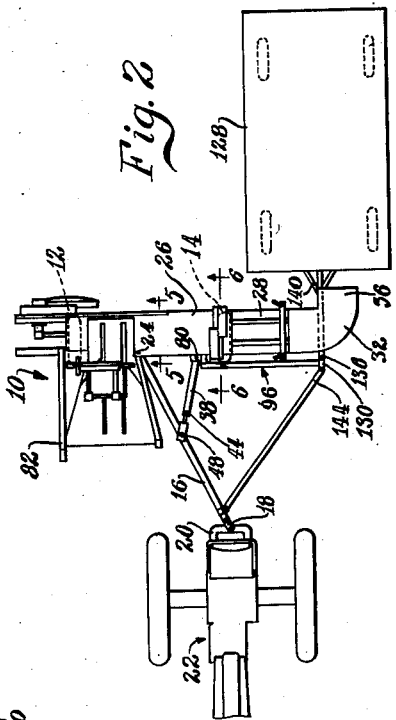
INVENTOR.
R. F. Heinje
Attorneys April 14, 1953  R. F. HEINJE  2,634,675
TRAILER HITCH FOR HAY BALERS
Filed Jan. 4, 1951  2 SHEETS—SHEET 2
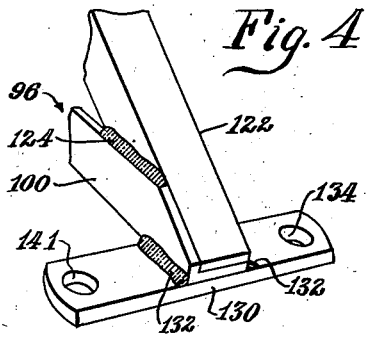
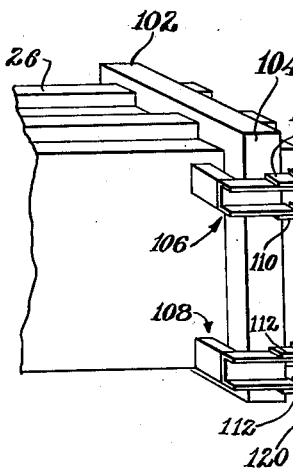
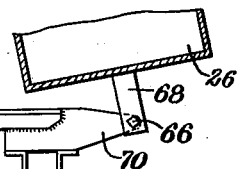
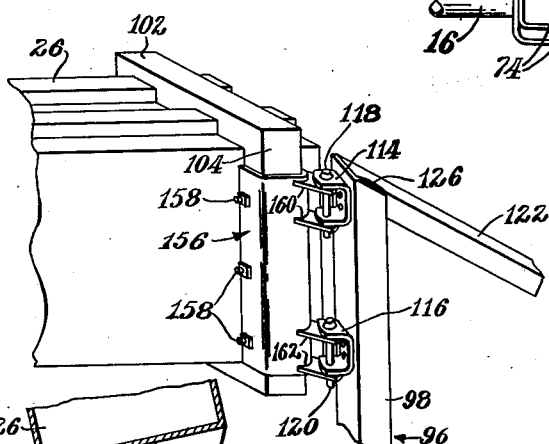
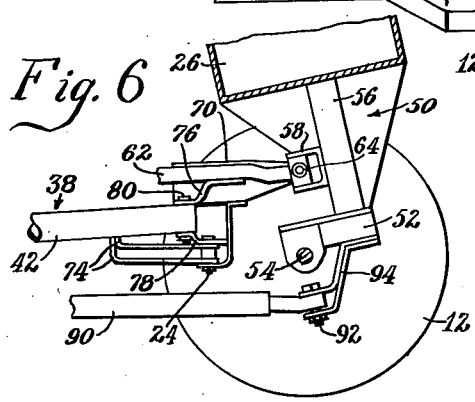
INVENTOR.
R. F. Heinje
BY
Attorneys Patented Apr. 14, 1953

2,634,675

UNITED STATES PATENT OFFICE 2,634,675

TRAILER HITCH FOR HAY BALERS

Robert F. Heinje, Ottumwa, Iowa, assignor to Deere Manufacturing Co., Dubuque, Iowa, a corporation of Iowa Application January 4, 1951, Serial No. 204,363

14 Claims. (Cl. 100—100)

This invention relates to a trailer hitch for hay balers and more particularly to a hitch for a baler of the type having a mobile frame adapted for travel forwardly over a field and including a bale case transverse to the line of travel and including a discharge opening through which bales are discharged laterally to one side of the baler.

In the conventional operation of a baler of the type referred to, the bales are discharged from the bale case to drop directly upon the ground, after which they are picked up and loaded on a wagon or other suitable vehicle. According to the present invention, an improved hitch is provided for the purpose of connecting directly to the baler a trailer in the form of a wagon or the like so that the bales may be successively discharged in such position as to be loaded directly upon the wagon as part of the baling operation.

It is an important object of the invention to provide an improved hitch in the nature of an attachment that will be capable of use with balers of the general class referred to. It is likewise an object of the invention to provide an inexpensive hitch that may be readily attached to or detached from such baler. A further feature of the invention resides in a hitch that is foldable alongside the baler so that when the baler is transported, its over-all width is substantially reduced.

The foregoing and other important objects and desirable features inherent in and encompassed by the invention will become apparent as a preferred embodiment of the invention is completely disclosed in the following detailed description and accompanying sheets of drawings in which Figure 1 is a perspective view of a baler equipped with one form of the improved hitch;

Figure 2 is a plan view, somewhat schematic, showing the baler as drawn by a tractor and as drawing a trailer;

Figure 3 is a detail view of one end of the brace means of the hitch;

Figure 4 is a detail view of the outer end of the hitch part showing the means for effecting the connection of the brace and the connection of the trailing vehicle;

Figure 5 is an enlarged fragmentary view as seen in section substantially along the line 5—5 of Figure 2;

Figure 6 is a similar view as seen along the line 6—6 of Figure 2;

Figure 7 is a perspective view showing one form of bracket means for mounting the hitch on the baler; and Figure 8 is a perspective view showing a modified form of bracket mounting for the hitch.

For the purposes of general orientation, reference will be had first to the schematic illustration in Figure 2. The baler is designated generally by the numeral 10 and comprises a mobile frame having a pair of laterally spaced wheels 12 and 14, which carry the baler for travel forwardly over the ground. The baler includes a forwardly extending frame part in the form of a draft tongue 16 equipped at its forward end with a clevis 18 for attachment to a drawbar 20 of a tractor 22. Only the rear portion of the tractor is shown. In normal operation, the baler trails rearwardly and somewhat to the right of the tractor, the offset relation being provided because of the angularity of the draft tongue 16 relative to the line of travel. The baler shown is of the type disclosed in U. S. Patent 2,499,500, wherein the draft tongue is illustrated as being pivoted on a vertical axis to the main frame of the baler. The corresponding pivot is indicated herein by the numeral 24 in Figures 2, 5 and 6.

The baler includes a bale case 26 disposed transversely as respects the line of travel. This bale case is complemented by a bale case extension 28 open at its outer end at 30 to provide an opening through which bales are successively discharged to a tail board 32. As shown, the tail board has an outwardly and rearwardly curved front wall 34 which serves to effect the guiding of bales outwardly and then rearwardly over a floor 36 of the tail board. In a conventional baler, bales discharged over the rear end of the floor 36 will drop directly to the ground and will be subsequently picked up and loaded on a wagon or other suitable vehicle. As shown in Figure 2, the discharge portion of the tail board 32 is to the left of the center line of the tractor 22, the discharge zone at this point being relatively remote from the baler proper.

The angular relationship of the draft tongue 16 to the line of travel is normally maintained by a main brace 38 which may be made up of a pair of telescopically arranged tubular members 40 and 42 normally fixedly interconnected by a removable pin 44 (Figure 1). The forward end of the tubular member 40 has a bifurcated member 46 which is pivotally connected by a pin 48 to a forward portion of the draft tongue 16. The connection of the rear end of the tubular member 42 is best shown in Figure 6. There is provided below the bale case 26, depending frame structure 50 including a support 52 for an axle 54 for the left-hand wheel 14. Here, as elsewhere herein, reference to the baler as having right- and left-hand sides is made with respect to the position of an observer standing behind the machine and facing forwardly.

The frame structure 50 also includes an upright support 56 from which projects a forwardly extending bearing bracket 58. The particular baler shown is of the type having its own source of power, here shown as an internal combustion engine 60 carried on a motor-supporting frame 62, the rear end of which is pivoted at 64 to the bearing bracket 58. These details are clearly brought about out in the U. S. patent referred to above and are mentioned only briefly here for the purposes of generally describing the type of draft frame structure for the baler.

In Figure 5, it will be seen that another portion of the motor-supporting frame 62 is pivoted at 66 to a depending bracket 68 below the bale case 26. The bracket 68 is in laterally spaced relation to the bracket 58 and the pivots 64 and 66 are in transverse alinement. This portion of the motor-supporting frame includes a vertical plate 70 from which depends a support 72 including the vertical pivot 24 previously referred to. The rear end of the draft tongue 16 is connected by a pair of straps 74 to the support 72 by means of the pivot 24. The rear portion of the motor-supporting frame 62 and the bracket or support structure 72—74 include supporting straps 76 and 78 connected by a pivot on a vertical axis at 80 to the rear end of the tubular member 42 of the main brace 38. The general location of the pivot 80 is indicated also in Figure 2, wherein it will be seen that the pivots 24 and 80 are laterally spaced apart and form two apices of a triangle of which the connection 48 forms the third apex. When it is desired to narrow the baler for the purposes of transport, the pin 44 is removed and the draft tongue 16 may be pivoted at 24 in a clockwise direction, as viewed in Figure 2.

Another component of the baler 10 is the pickup mechanism, designated herein generally by the numeral 82. In the type of baler shown, the pick-up mechanism, which may be conventional, is a rigid part of the structure including the bale case. Therefore, the entire baler may be pivoted about a transverse horizontal axis through the axles of the wheels 12 and 14. The pick-up is raised and lowered relative to the draft tongue about the pivot 64 by means of a hand control lever 84. It will be understood, inasmuch as the motor-supporting frame 62 and main brace 38 are connected to the same structure including the plate 70 and its appendant parts 72 and 74, the bale case 26 will pivot at 64 relative to the entire structure involving the parts just designated.

The hand lever 84 is pivoted at 86 to a forward part of the draft tongue 16 and a depending portion of the lever is pivotally connected at 88 to the forward end of a control link 90. The rear end of the link 90 is pivotally connected at 92 to a depending bracket 94 secured to the axle bracket 52. Consequently, as the lever 84 pivots about its pivot 86, the link 90 effects pivoting of the bale case about the pivot 64 relative to the supporting structure including the motor-supporting frame 62, the draft tongue 16 and the main brace 38. The arrangement is such that the pick-up 82 may be raised to such extent that the draft tongue 16 may swing underneath the pick-up.

The foregoing completes the general and brief description of the particular type of baler illustrated. The following description will pertain to the hitch means and its relationship to the baler and to a trailing vehicle drawn by the combination unit.

As best shown in Figure 1, the hitch comprises a main hitch bar 96 preferably in the form of an L having a vertical leg 98 and a horizontal leg 100. This hitch bar is shown as being constructed of an angle member, although any other suitable section could be utilized. The outer end of the bale case proper includes a surrounding collar 102, the forward portion of which is generally upright and thus provides an upright supporting portion 104. In the form of the invention shown in Figures 1 and 7, the outer end of the bale case has fixed thereto bracket means comprising a pair of vertically spaced brackets 106 and 108, both of which embrace the upright supporting portion 104 of the collar 102. These brackets may be formed as illustrated or may be otherwise constructed, as will hereinafter appear in connection with a description of Figure 8. The upper bracket 106 is provided with a pair of outwardly extending, vertically alined apertured ears 110 and a similar pair of ears 112 is provided on the lower bracket 108. The upper portion of the vertical leg 98 of the hitch bar 96 is provided with a pair of vertically spaced, apertured pivot elements 114 and 116 respectively. The apertures in the associated ears 110 and 112 and pivot elements 114 and 116 are vertically alined and respectively receive pivot pins 118 and 120 which comprise means for pivotally connecting the hitch bar to the baler on an upright or vertical pivot axis.

The horizontal leg 100 of the L-shaped bar 96 extends outwardly to a point beyond the discharge opening 30. A diagonal brace 122, preferably in the form of an angle bar, has its outer end rigidly secured, preferably by welding at 124 (Figure 4), to the outer end of the horizontal leg 100, and further has its inner or upper end preferably rigidly secured, as by welding at 126 (Figure 1), to the upper end of the vertical leg 98. The outer end of the hitch bar structure, as thus constituted by the L-shaped member 96 and brace 122, is equipped with means for effecting the connection to the hitch bar of a trailing vehicle, such as a wagon designated generally by the numeral 128 in Figure 2. This wagon could be any other trailing vehicle, such as a sled or the like conventionally used in transporting agricultural produce. The particular type of means shown includes a short fore-and-aft extending bar 130 rigidly secured, as by welding at 132, to the outer end of the hitch bar 96. The rear portion of the short bar 130 is apertured at 134 to receive a hitch pin 136 passed also through an apertured clevis 138 at the forward end of a tongue 140 on the trailer or wagon 128.

The forward portion of the short bar 130, that is the portion ahead of the hitch bar 96, is apertured at 141, to receive a removable pin 142 which provides means for effecting a connection between the hitch bar 96 and a forwardly and inwardly extending brace 144. The pin 142 provides a combined pivotal and disconnectible connection, for purposes to presently appear.

The forward end of the brace 144 includes a clevis 146 (Figure 3) which is apertured to receive a pin 148 that effects a pivotal connection with an attaching bracket 150. This bracket is adapted to be attached by a pin or bolt 152 to a forward part of the draft tongue 16. The pin 148 is normally retained in place by a removable cotter 154 (Figure 3). The connection at 142 may be identical to that shown in Figure 3, both connections being therefore pivotal and disconnectible.

In normal operation, the triangular structure provided by the hitch bar 96, brace 144 and the baler takes both horizontal and vertical forces applied to the hitch structure and the trailer or wagon 128 becomes a flexible though integral part of the harvesting or baling unit. When it is desired to prepare the baler for transport, the brace 144 may be disconnected at 142 from the hitch bar part 130 and the hitch bar may be swung forwardly alongside the baler. The connection afforded at 148 is sufficiently loose to enable the rear portion of the brace 144 to be passed through the space between the horizontal leg 100 and the diagonal brace 122, wherefore both components of the hitch may be folded in supported relationship alongside the baler. The baler may be further narrowed by the procedure outlined above in connection with the mounting and functioning of the draft tongue 16.

The modified form of bracket structure for connecting the hitch bar 96 to the supporting portion 104 of the collar 102 at the outer end of the bale case 26, as shown in Figure 8, comprises a one-piece, channel-shaped, elongated bracket 156 that embraces the upright supporting portion 104 and that is secured to said portion as by a plurality of nut and bolt assemblies 158. The bracket 156 is provided with an upper pair of vertically spaced ears 160 and a similar pair of lower ears 162. These extend outwardly and forwardly and are apertured to receive the pivot pins 118 and 120 by means of which the pivotal connection is effected between the baler and the hitch bar 96. In other respects, the modified form may be similar or identical to that previously described.

From the foregoing description, it will be seen that the improved hitch is of simple construction and may be readily attached to the baler without materially modifying the baler construction. It is flexible in operation, particularly since it may be folded for transport. In normal operation, it is sufficiently rigid to take applicable horizontal and vertical forces and thus enables the efficient use with the baling unit of a trailing wagon onto which bales discharged from the tail board 32 may be readily loaded.

Other important features and aspects of the invention not specifically enumerated herein will undoubtedly occur to those versed in the art, as likewise will various modifications and alterations in the preferred forms of the invention illustrated, all of which may be achieved without departing from the spirit and scope of the invention as defined in the appended claims.

What is claimed is:

1. For a mobile baler adapted to travel forwardly over the ground and including a forwardly extending draft tongue and a bale case disposed transverse to the line of travel and having an outer bale-discharge end, a trailer hitch comprising: a bracket having means thereon for the mounting thereof on the bale case inwardly of the discharge end of the bale case; a hitch bar of L shape having a vertical leg positionable adjacent the bracket and a horizontal leg to extend outwardly at the discharge end of the bale case; means mounting the vertical leg on the bracket for pivoting about a vertical axis; a hitch part at the outer end of the horizontal leg for attaching a trailer; and a brace having front and rear ends and positionable to extend diagonally forwardly and inwardly from the outer end of the horizontal leg to a forward part of the baler draft tongue, said brace having means for pivotally connecting its rear end to the outer end of the horizontal leg and other means for pivotally connecting its forward end to the forward part of the baler draft tongue.

2. The invention defined in claim 1, further characterized in that: the bracket is vertically elongated; and the means for pivoting the vertical leg of the L-shaped hitch bar on the bracket includes a pair of vertically spaced and alined pivot supports fixed to the bracket.

3. For a mobile baler adapted to travel forwardly over the ground and including a forwardly extending draft tongue and a bale case disposed transverse to the line of travel and having an outer bale-discharge end formed with an upright support, a trailer hitch comprising: a bracket having means thereon for the fixed mounting thereof on the upright support; a hitch bar of L shape having a vertical leg positionable adjacent the bracket and a horizontal leg to extend outwardly at the discharge end of the bale case; means mounting the vertical leg on the bracket for pivoting about a vertical axis; a hitch part at the outer end of the horizontal leg for attaching a trailer; and a brace having front and rear ends and positionable to extend diagonally forwardly and inwardly from the outer end of the horizontal leg to a forward part of the baler draft tongue, said brace having means for pivotally connecting its rear end to the outer end or the horizontal leg and other means for pivotally connecting its forward end to the forward part of the baler draft tongue.

4. The invention defined in claim 3, further characterized in that: the bracket embraces the upright support and includes a pair of vertically spaced apart apertured ears; and the means for pivoting the vertical leg of the hitch bar on the bracket includes a pair of vertically spaced apart and alined pivot elements on the vertical leg and connected respectively with the ears on the bracket.

5. The invention defined in claim 3, further characterized in that: the bracket comprises an elongated upright channel member that embraces the upright support and includes a pair of vertically spaced apart apertured ears; and the means for pivoting the vertical leg of the hitch bar on the bracket includes a pair of vertically spaced apart and alined pivot elements on the vertical leg and connected respectively with the ears on the bracket.

6. For a mobile baler adapted to travel forwardly over the ground and including a forwardly extending frame portion and a bale case disposed transverse to the line of travel and having an outer bale-discharge end, a trailer hitch comprising: a bracket having means thereon for the mounting thereof on the bale case inwardly of the discharge end of the bale case; a hitch bar of L shape having a vertical leg positionable adjacent the bracket and a horizontal leg to extend outwardly at the discharge end of the bale case; means mounting the vertical leg on the bracket for pivoting about a vertical axis; a hitch part at the outer end of the horizontal leg for attaching a trailer; and a brace having front and rear ends and positionable to extend diagonally forwardly and inwardly from the outer end of the horizontal leg to a forward part of the aforesaid forwardly extending frame portion of the baler, said brace having means for pivotally connecting its rear end to the outer end of the horizontal leg and other means for pivotally connecting its forward end to said forward part of the frame portion.

7. The invention defined in claim 6, further characterized in that: the bracket is vertically elongated; and the means for pivoting the vertical leg of the L-shaped hitch bar on the bracket includes a pair of vertically spaced and alined pivot supports fixed to the bracket.

8. For a mobile baler adapted to travel forwardly over the ground and including a forwardly extending frame portion and a bale case disposed transverse to the line of travel and having an outer bale-discharge end, a trailer hitch comprising: a bracket having means thereon for the mounting thereof on the bale case inwardly of the discharge end of the bale case; a hitch bar having an inner end including means for the connection thereof to the bracket and positionable to extend substantially horizontally outwardly to an outer end having means for the connection thereto of a trailer; and a forwardly and inwardly extending brace having front and rear ends, the rear end having means for connection to the outer end of the hitch part and the front end having means for connection to a forward part of the forwardly extending frame portion of the baler.

9. For a mobile baler adapted to travel forwardly over the ground and including a forwardly extending frame portion and a bale case disposed transverse to the line of travel and having an outer bale-discharge end, a trailer hitch comprising: a bracket having means thereon for the mounting thereof on the bale case inwardly of the discharge end of the bale case; a hitch bar having an inner end including means for the pivotal connection thereof to the bracket on a vertical axis and positionable to extend substantially horizontally outwardly to an outer end having means for the connection thereto of a trailer; a forwardly and inwardly extending brace having front and rear ends, the rear end having means for connection to the outer end of the hitch part and the front end having means for connection to a forward part of the forwardly extending frame portion of the baler; and one of said last named means including a pivot on a vertical axis and the other of said last named means including disconnectible elements.

10. The invention defined in claim 9, further characterized in that: a second brace inclines outwardly and downwardly from an inner end adjacent the bracket to an outer end adjacent and fixed to the outer end of the hitch part; and means is provided at the inner end of the second brace for the pivotal connection thereof to the baler above and vertically coaxial with the pivot of the hitch part to the bracket.

11. For a mobile baler adapted to travel forwardly over the ground and including a forwardly extending frame portion and a bale case disposed transverse to the line of travel and having an outer bale-discharge end, a trailer hitch comprising: an elongated hitch bar positionable to extend transversely and having an inner end adjacent the baler and an outer end relatively laterally remote from the baler; means at the inner end of the hitch bar for supporting said inner end on the baler; second means at the outer end of the hitch bar for the connection thereto of a trailer to be drawn parallel to the baler; and brace means connected to the hitch bar outwardly of its inner end and having means for the connection thereof to the baler in fore and aft spaced relation to the connection of the inner end of the hitch bar to the baler.

12. The invention defined in claim 11, further characterized in that: the means connecting the inner end of the hitch bar to the baler includes a pivot on a vertical axis; and the brace includes disconnectible means providing for the disconnection thereof between the baler and the hitch part for folding of the hitch part relative to the baler about the aforesaid pivot.

13. The invention defined in claim 11, further characterized in that: a second brace means is connected to the hitch part outwardly of its inner end and inclines inwardly and vertically and having means for effecting a supporting connection with the baler in vertically spaced relation to the connection of the inner end of the hitch bar to the baler.

14. The invention defined in claim 13, further characterized in that: the means connecting the inner end of the hitch bar to the baler includes a pivot on a vertical axis; the means for effecting the supporting connection between the second brace means and baler includes a pivot coaxial with the first named pivot; and the first brace includes disconnectible means providing for the disconnection thereof between the baler and the hitch part for folding of the hitch part and second brace means relative to the baler about the aforesaid coaxial pivots.

ROBERT F. HEINJE.

References Cited in the file of this patent

UNITED STATES PATENTS

| Number | Name | Date |
| --- | --- | --- |
| 1,941,670 | Everett | Jan. 2, 1934 |
| 2,499,500 | Hill et al. | Mar. 7, 1950 |
| 2,516,646 | Reiter et al. | July 25, 1950 |
| 2,524,669 | Knoblauch | Oct. 3, 1950 |